United States Patent
D'Amelio et al.

(10) Patent No.: US 9,967,631 B2
(45) Date of Patent: May 8, 2018

(54) AUTOMATED AUDIO-BASED DISPLAY INDICIA ACTIVATION BASED ON VIEWER PREFERENCES

(71) Applicant: International Business Machines Corporation, Armonk, NY (US)

(72) Inventors: Richard E. D'Amelio, Holly Springs, NC (US); Heather L. Duschl, Raleigh, NC (US); Kassidy B. Martz, Lehighton, PA (US); Ha H. Nguyen, Morrisville, NC (US); Luke M. Oppenhuis, Apex, NC (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days. days.

(21) Appl. No.: 14/938,126

(22) Filed: Nov. 11, 2015

(65) Prior Publication Data
US 2017/0134821 A1    May 11, 2017

(51) Int. Cl.
*H04N 5/445* (2011.01)
*H04N 7/025* (2006.01)
(Continued)

(52) U.S. Cl.
CPC ......... *H04N 21/4884* (2013.01); *G06F 3/165* (2013.01); *H04N 21/25891* (2013.01); *H04N 21/42203* (2013.01); *H04N 21/4394* (2013.01); *H04N 21/4532* (2013.01); *H04N 21/4755* (2013.01)

(58) Field of Classification Search
CPC ......... H04N 21/25891; H04N 21/4755; H04N 21/4884
See application file for complete search history.

(56) References Cited

U.S. PATENT DOCUMENTS 7,430,360 B2   9/2008  Abecassis
8,489,769 B2   7/2013  Chuan
(Continued)

FOREIGN PATENT DOCUMENTS

CN   100440953 C   12/2008
JP   200702845 A   7/2005

OTHER PUBLICATIONS

IBM,"Automatic TV Picture in Picture pop-up based on Closed Caption Keyword Match," IP.com Prior Art Database Technical Disclosure, IPCOM000015764D, Mar. 13, 2002, pp. 1-3.
(Continued)

*Primary Examiner* — James R Marandi
(74) *Attorney, Agent, or Firm* — Cantor Colburn LLP (57) ABSTRACT

Aspects relate to computer implemented methods, systems, and processes to automatically enable audio-based display indicia during playback of a media content including receiving, by a processor, one or more user preference audio profiles, the user preference audio profiles defining at least one audio characteristic and an associated criteria, playing the media content having audio-based display indicia, monitoring, with one or more detectors, the at least one audio characteristic defined in the user preference audio profiles, and when the at least one audio characteristic meets the associated criteria, enabling the audio-based display indicia in the media content.

14 Claims, 3 Drawing Sheets

(51) Int. Cl.
*H04N 7/10* (2006.01)
*G06F 3/00* (2006.01)
*G06F 13/00* (2006.01)
*H04N 21/488* (2011.01)
*H04N 21/439* (2011.01)
*H04N 21/258* (2011.01)
*H04N 21/45* (2011.01)
*H04N 21/422* (2011.01)
*G06F 3/16* (2006.01)
*H04N 21/475* (2011.01)

(56) References Cited

U.S. PATENT DOCUMENTS

| | | |
|---|---|---|
| 8,854,447 B2 | 10/2014 | Conness et al. |
| 8,922,622 B2 | 12/2014 | Hamada et al. |
| 8,977,974 B2 | 3/2015 | Kraut |
| 2005/0038661 A1* | 2/2005 | Momosaki .............. G10L 25/00 704/275 |
| 2006/0114757 A1 | 6/2006 | Theimer et al. |
| 2007/0027682 A1 | 2/2007 | Bennett |
| 2010/0045866 A1* | 2/2010 | Angiolillo .......... H04N 5/44513 348/554 |
| 2010/0290633 A1* | 11/2010 | Chen ........................ H03G 3/32 381/57 |
| 2010/0293165 A1* | 11/2010 | Eldering ................ G06Q 30/02 707/737 |
| 2011/0095875 A1* | 4/2011 | Thyssen ................... G09G 5/10 340/407.1 |
| 2012/0014540 A1 | 1/2012 | Lu et al. |
| 2014/0150002 A1 | 5/2014 | Hough et al. |
| 2014/0184905 A1 | 7/2014 | Mountain |
| 2016/0330396 A1* | 11/2016 | Garcia Navarro ...... G10L 21/10 |

OTHER PUBLICATIONS

Sony Corporation, "Remote Controller with Setting Button", IPCOM 000156094D, Electronic Publication, Jul. 27, 2007, pp. 1-4.

* cited by examiner

AUTOMATED AUDIO-BASED DISPLAY INDICIA ACTIVATION BASED ON VIEWER PREFERENCES

BACKGROUND

The present disclosure relates generally to audio-based display indicia in media playback and, more specifically, to methods, systems, and processes for automated audio-based display indicia activation in media playback based on viewer preferences.

A video or other media may include audio-based display indicia, such as subtitles or closed captions. The subtitles or closed captions can provide a translation or a transcript of the spoken dialogue and/or sounds in the content of the media that is played back, such as a video, and, optionally, the audio-based display indicia may contain other information to provide context and/or indicia to a viewer regarding the content of the media. Closed captions may be useful to hearing impaired viewers. Subtitles may be useful for viewing foreign language videos or for viewing videos in a noisy environment.

When volume level changes during media playback occur, it can be hard to understand the characters at all times. In some scenes the characters may be speaking at an audible level, but in other scenes the volume level may be too quiet for a viewer to hear clearly. Characters may also speak too quietly compared to the other audio tracks of the media content (e.g., as compared to music, sound effects, etc. that are part of the media content) for a particular viewer to hear the spoken aspects clearly. For example, this may be especially problematic in action/thriller movies that switch between very loud action scenes and quiet calm scenes. Further, viewers with hearing impairments may only be able to hear at certain volumes or frequencies. A viewer may turn on, activate, or enabled audio-based display indicia, but the audio-based display indicia presented on the screen may obscure the view of the screen and/or detract from the overall viewing experience. Further, actively enabling and disabling the audio-based display indicia may be cumbersome or difficult for a viewer.

SUMMARY

According to embodiments, a method, system, and computer program product are provided for automatically enabling audio-based display indicia during media playback including receiving, by a processor, one or more user preference audio profiles, the user preference audio profiles defining at least one audio characteristic and an associated criteria, playing back media content having audio-based display indicia, monitoring, with one or more detectors, at least one audio characteristic defined in the user preference audio profiles, and when the at least one audio characteristic meets the associated criteria, enabling the audio-based display indicia in the media content.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

Embodiments described herein are directed to automatically turning on, activating, or enabling audio-based display indicia, such as subtitles or closed captioning, when an audio or the dialogue track of a media playback, such as a video, drops below a certain decibel level or range or when the audio of the media playback meets certain other criteria as defined by a user or viewer. If the volume level of the media playback returns to a certain decibel, e.g., meets or exceeds a predetermined threshold level, or the user-based criteria are no longer met, the audio-based display indicia will automatically turn off, deactivate, or disable. As used herein, media playback refers to any presentation of media that includes a video component and an audio component, including, but not limited to recorded videos, movies, television shows, live broadcasts, etc.

Figure 1:
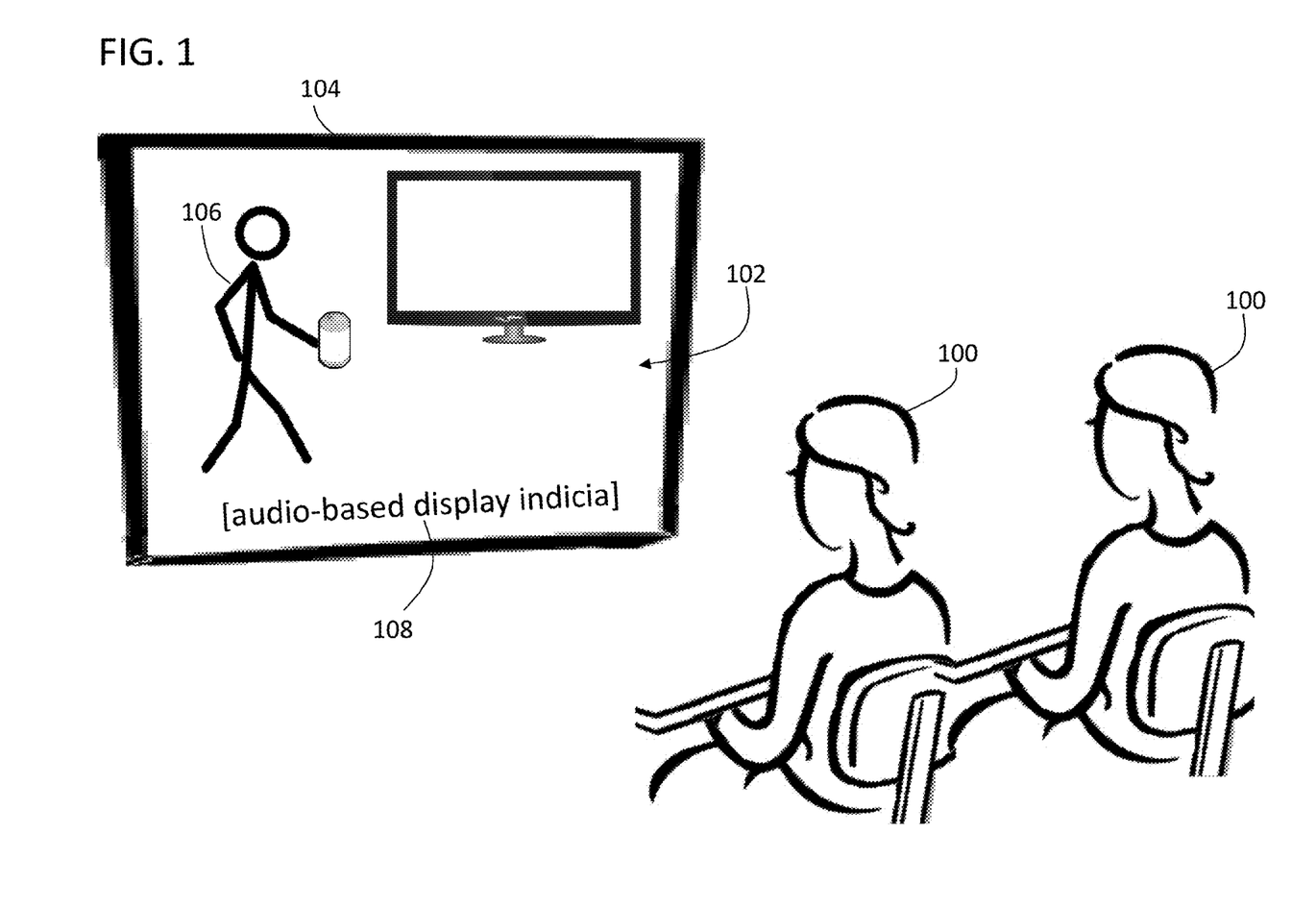
FIG. 1 depicts a schematic illustration of viewers viewing a playback of media content having audio-based display indicia using an system in accordance with a non-limiting embodiment of the present disclosure.

As shown in FIG. 1, an example of viewers observing playback of media content, such as a video, in accordance with a non-limiting embodiment of the present disclosure is shown. FIG. 1 depicts an example of viewers 100 viewing media content 102 during playback displayed on a screen 104, the screen 104 being part of, for example, a television, a computer, a movie theater screen, etc. In a scene depicted on the screen 104, an actor or character 106 is shown, and the character 106 may have dialogue that is part of an audio track of the media content. The content of the media playback may include existing subtitles and/or closed captioning capability to enable display of audio-based display indicia 108. As used herein, the term "audio-based display indicia" includes subtitles, closed captioning, and/or other text or images that may be displayed on a screen during a media playback that represents dialogue or other audible sounds that may be shown or described to a viewer to aid in understanding speech, dialogue, or other aspects of a narrative of media content during playback.

Subtitling may be used as a way of translating a medium into another language so that speakers of other languages can enjoy spoken material. Subtitles may be derived from either a transcript or screenplay of the dialog or commentary in films, television programs, video games, and the like. Additional information may be configured within the subtitles to help viewers who are deaf and/or hard of hearing to follow the dialog, people who cannot understand the spoken dialogue, and/or people who have accent recognition problems. For example, foreign films are an example that may employ subtitles. Without subtitles, English-speaking audiences may be unable to easily follow the plot of a French or Spanish movie. However, subtitles may be provided with the pre-recorded media content, such as movies and TV shows, wherein the subtitles are an embedded feature of the data that is used for playing back the media content. As such, the subtitles may be displayed as the audio is played back with the media content, e.g., simultaneously or nearly simultaneously.

Captioning or closed captioning may be used as a service to aid deaf and hearing-impaired audiences or for other reasons, such as when a viewer mutes playback of media content. Captions are adaptable to live broadcasts, such as news broadcasts, sports events, and television shows broadcast live. In some instances, captions may be broadcast or provided with a delay from the actual audio dialogue being spoken in the media content.

Figure 2:
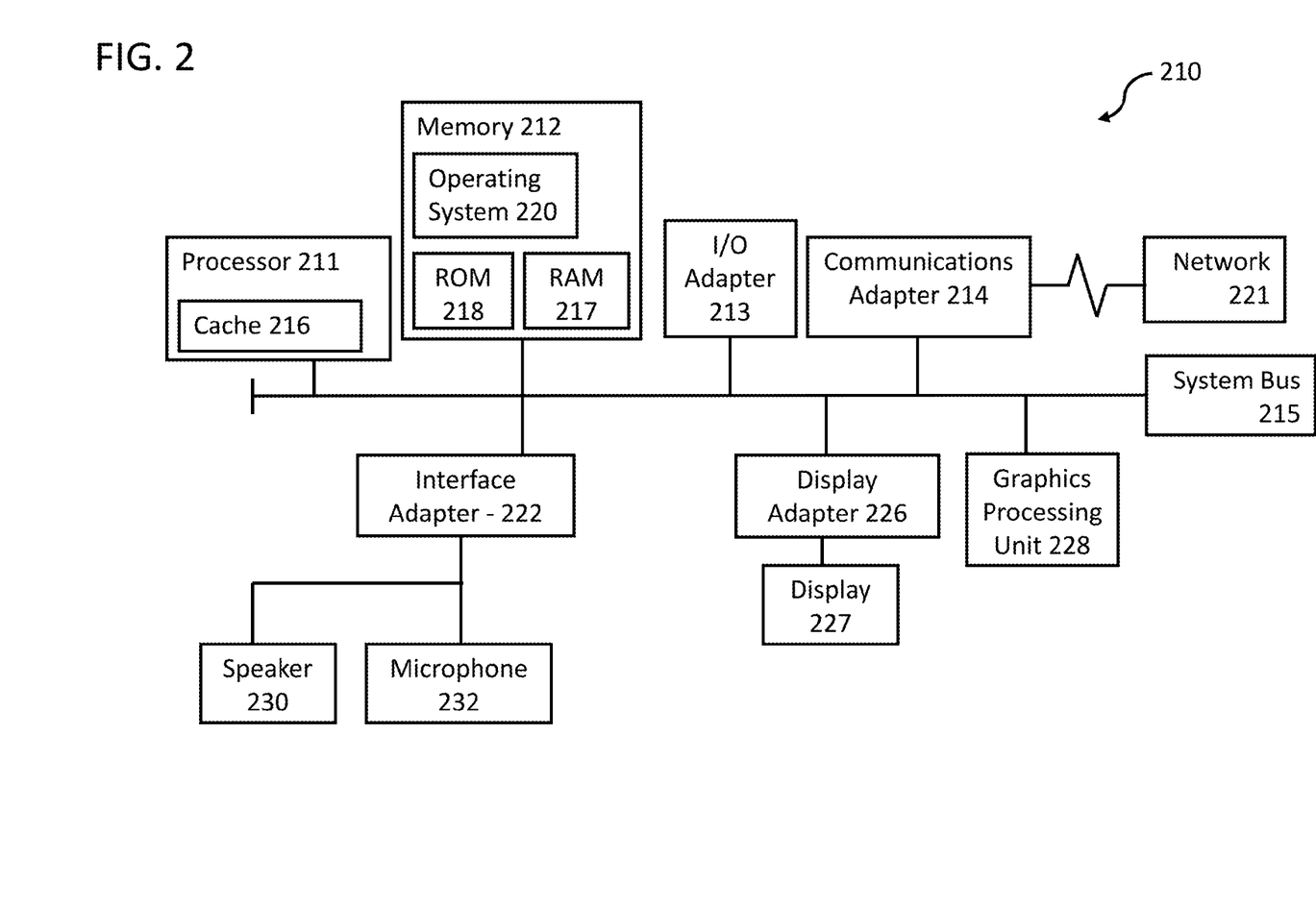
FIG. 2 illustrates a block diagram of a computer system for use in practicing the teachings herein.

Turning now to FIG. 2, a block diagram of a computing system 210 (hereafter "system 210") for use in practicing the embodiments described herein is shown. The methods and processes described herein can be implemented in hardware, software (e.g., firmware), or combinations thereof. In an example embodiment, the methods described herein may be implemented in hardware, and may be part of a microprocessor of a special or general-purpose digital computing system, such as a personal computer, television, projector, minicomputer, or other computing device, especially one configured for displaying playback of media content, such as videos and/or movies. The system 210 therefore can embody a general-purpose computing system and may be a computing part or subpart of an electronic device, such as a media playback device. In another embodiment, the methods described herein may be implemented as part of a mobile device, such as, for example, a mobile phone, a personal data assistant (PDA), a tablet computer, laptop computer, etc.

In the non-limiting embodiment of FIG. 2, in terms of hardware architecture, the system 210 includes a processor 211. The system 210 also includes memory 212 coupled to the processor 211, and one or more input and/or output (I/O) adapters 213, that may be communicatively coupled via a local system bus 215. The memory 212 and/or other components of the system 210 may be operatively coupled to one or more internal or external memory devices accessed through a network 221. A communications adapter 214 may operatively connect the system 210 to the network 221. The system bus 215 may also connect one or more user interfaces via interface adapter 222. Interface adapter 222 may connect a plurality of user interfaces to the system 210 including, for example, touch screens (e.g., part of a display 227), keyboard, mouse, speaker, remote control, etc., that may be part of the system 210. In one non-limiting example, the interface adapter 222 may enable a user of the system 210 to input data through a touch screen, a keyboard, a remote control, or other user input device.

The system bus 215 may also connect a display adapter 226 and a display 227 to the processor 211. The processor 211 may also be operatively connected to a graphical processing unit 228 used for displaying images and/or information on the display 227, such as media content during playback. Further, the processor 211 and other components may be configured to overlay and display audio-based display indicia onto an image on the display 227. In some embodiments, the display 227 may be a screen in a movie theater, television, monitor, etc. and some or all of the other components of system 210 may be configured separate therefrom (e.g., in a set-top box, gaming console or system, personal computer, etc.).

The processor 211 may be a hardware device for executing hardware instructions or software that may be stored in a non-transitory computer-readable memory (e.g., memory 212) or provided from an external source through the network 221. The processor 211 can be any custom made or commercially available processor, a central processing unit (CPU), a plurality of CPUs, an auxiliary processor among several other processors associated with the system 210, a semiconductor based microprocessor (in the form of a microchip or chip set), a macroprocessor, or generally any device for processing data and/or executing instructions. The processor 211 can include a memory cache 216.

The memory 212 can include random access memory (RAM) 217 and read only memory (ROM) 218. The RAM 217 can be any one or combination of volatile memory elements (e.g., DRAM, SRAM, SDRAM, etc.). The ROM 218 can include any one or more non-volatile memory elements (e.g., erasable programmable read only memory (EPROM), flash memory, electronically erasable programmable read only memory (EEPROM), programmable read only memory (PROM), tape, compact disc read only memory (CD-ROM), disk, cartridge, cassette or the like, etc.). Moreover, the memory 212 may incorporate electronic, magnetic, optical, and/or other types of non-transitory computer-readable storage media. As will be appreciated by those of skill in the art, the memory 212 can have a distributed architecture, where various components are situated remote from one another, but can be accessed by the processor 211.

The instructions in the memory 212 may include one or more separate programs, each of which comprises an ordered listing of computer-executable instructions for implementing logical functions. In the example of FIG. 2, the instructions in the memory 212 may include a suitable operating system 220. The operating system 220 can control the execution of other computer programs and provide scheduling, input-output control, file and data management, memory management, and communication control, and related services. For example, the operating system 220 may be an operating system for a personal computer, television, etc. that includes the processor 211 and other associated components as shown and described in system 210.

The I/O adapter 213 can be, for example but not limited to, one or more buses or other wired or wireless connections, as is known in the art. The I/O adapter 213 may have additional elements, which are omitted for simplicity, such as controllers, buffers (caches), drivers, repeaters, and receivers, to enable communications. The I/O adapter 213 may be configured to receive input from a DVD player (or the like) or other device that may supply media or content for media playback.

As noted above, the interface adapter 222 may be configured to operatively connect one or more I/O devices to the system 210. For example, in some configurations, the interface adapter 222 may connect a conventional keyboard and mouse or be configured to receive input from a remote control device associated with the system 210. Other output devices operatively connected to the interface adapter 222 may include a speaker 230 and a microphone 232. Further, other output devices may also be included, although not shown. The I/O devices connectable to the interface adapter 222 may further include devices that communicate both inputs and outputs, for instance but not limited to, a network interface card or modulator/demodulator (for accessing other files, devices, systems, or a network), a radio frequency or other transceiver, a telephonic interface, a bridge, a router, and the like. Further, the interface adapter 222 may enable communication with one or more electronic devices, such as over Bluetooth or other near-field communications protocol. As will be appreciated by those of skill in the art, sound detected at the microphone 232 may be converted to data that is sent to the processor 211 for processing in accordance with embodiments provided herein.

The network 221 can be an IP-based network for communication between system 210 and any external device(s), e.g. servers. The network 221 enables transmissions of data between the system 210 and external systems. In a non-limiting embodiment, the network 221 can be a managed IP network administered by a service provider. The network 221 may be implemented in a wireless fashion, e.g., using wireless protocols and technologies, such as WiFi, WiMax, etc. The network 221 can also be a packet-switched network such as a local area network, wide area network, metropolitan area network, Internet network, or other similar type of network environment. The network 221 may be a fixed wireless network, a wireless local area network (LAN), a wireless wide area network (WAN) a personal area network (PAN), a virtual private network (VPN), intranet or other suitable network system. The network 221 may enable the system 210 to provide streaming media playback from internet-based services.

In some embodiments, the instructions in the memory 212 may further include a basic input output system (BIOS) (omitted for simplicity). The BIOS is a set of essential routines that initialize and test hardware at startup, start the operating system 220, and support the transfer of data among the operatively connected hardware devices. The BIOS may be stored in the ROM 218 so that the BIOS can be executed when the system 210 is activated. When the system 210 is in operation, the processor 211 may be configured to execute instructions stored within the memory 212, to communicate data to and from the memory 212, and to generally control operations of the system 210 pursuant to the instructions.

During playback of a video or other media content, the volume levels may change and it may be hard for a user (e.g., viewer 100 in FIG. 1) to understand dialogue between characters within the narrative of the media content. In some scenes of the narrative, the characters may be speaking at an audible level (e.g., a level that is readily heard and understood by a user), but in others scenes, the audio or dialogue may be too quiet to hear clearly (e.g., a level that is difficult to be heard and/or understood by a user). Characters in a narrative may also speak too quietly compared to the other audio tracks of the media (e.g., music, sound effects, etc.) such that a user may not be able to hear the dialogue clearly or easily. This may be especially problematic in action/thriller movies that switch between very loud action scenes and quiet calm scenes. Additionally, viewers or users with hearing impairments may only be able to hear at certain volumes (i.e., audio amplitudes) and/or audio frequencies (e.g., pitch of a character's voice). When a user has trouble hearing or understanding dialogue in a narrative in media content during media playback, the user may turn on audio-based display indicia to be able to understand the dialogue. However, the audio-based display indicia may obscure the view of the screen and the images thereon or detract from the overall viewing experience by the user, and thus, a user may wish to turn off or disable the audio-based display indicia once the user can hear more clearly.

As such, embodiments provided herein enable automatic audio-based display indicia activation when an audio or dialogue track of media playback drops below a predefined threshold (e.g., a decibel level or range) or when the audio of the media playback meets certain other criteria as defined by the user, user-based criteria, which may include input user-preferences and/or learned user-preferences. Further, in some embodiments, during playback, when the dialogue volume reaches or exceeds the predefined threshold, the audio-based display indicia may automatically turn off or be disabled. Further, in some embodiments, the automatic audio-based display indicia activation may occur based on an ambient noise level. As such, various embodiments of the present disclosure provide a system of comparing a first audio level (e.g., an audio level of content having associated audio-based display indicia) with one or more second audio levels (e.g., audio levels of sounds from a source other than audio of content having associated audio-based display indicia). Another configuration may monitor one or more characteristics of audio and determine if associate criteria are met. For example, an audio frequency of an audio track may be monitored, and if the audio frequency meets certain predefined criteria (e.g., a high frequency above a certain value or threshold) the system may enable the audio-based display indicia.

In accordance with embodiments of the present disclosure, the systems and processes disclosed herein may incorporate user-preferences. The user-preferences may be user-defined or user-specific and may include one or more audio characteristics and one or more criteria associated with the one or more audio characteristics. The audio characteristics may include volume levels of dialogue within media content, volume levels of non-dialogue audio within the media content (e.g., music, background noise, sound effects, etc.), frequencies of audio within the media content, ambient noise, or other audio that may be experienced by a viewer of the media content. The criteria may be values, thresholds, comparisons, etc. of or between one or more of the characteristics wherein a user desires to have audio-based display indicia presented during playback of media content.

A user may input a user's preferences directly into the system. For example, a user may use an interactive feature to test various noise levels and manually input when the user desires audio-based display indicia to be enabled. Further, a user may define different criteria for different audio characteristics. For example, a user may set a first criterion to a first audio characteristic and a second criterion to a second audio characteristic. In one non-limiting example, a user may input a level or amplitude of ambient noise when they desire audio-based display indicia to be display, and they may also set a certain frequency or frequency range of spoken audio that the user desires audio-based display indicia to be displayed.

In some embodiments, the system may learn a user's preferences for the presentation of audio-based display indicia during a media content playback such that the audio-based display indicia are only used and presented when a user prefers the audio-based display indicia to be present. That is, the system may track a user's habits and/or actions with respect to enabling and disabling audio-based display indicia, and generate a profile based on the habits and/or actions of the user. That is, the system may dynamically generate a user preference audio profile based on the user's habits and actions, without requiring a user's active input. In some embodiments, dynamic user preference audio profile generation may be combined with direct user input.

During learning and dynamic generation of a user preference audio profile, sensors and/or input devices (e.g., speakers, microphones, etc.), hereinafter "detectors," may be configured such that a processor of the system may generate a user profile that is specific to a particular user. The detectors may be configured as a dedicated device, such as a microphone that can detect noise received at the microphone and/or may be part of a processor. For example, the detector may be configured as process performed by the processor to monitor an audio data stream associated with a playback of media content, wherein various characteristics (e.g., audio frequency, audio amplitude, etc.) may be monitored for various criteria being met.

The system may track when a user enables audio-based display indicia during a media playback and compare such action to various audio characteristics (e.g., volume levels, frequencies, etc.). For example, the system may detect that the overall volume level of the content of the media playback transitions from a loud scene to a quiet scene (e.g., an action movie with loud sounds and/or music transitions to a quiet scene with talking) and further detect when a user enables the audio-based display indicia. In such a situation, the system may learn specific audio volume metrics when a user desires to have audio-based display indicia presented on-screen. That is, the system may learn and determine user-specific criteria for various audio characteristics for enabling and disabling audio-based display indicia.

Further, the system may track when a user enables audio-based display indicia based on a change in the difference in an audio level between a spoken track (e.g., dialogue) and other tracks (e.g., music) within the playback of the media content. Another audio characteristic may be related to audio frequency, and thus the system may track the audio frequency of an audio track and when the audio-based display indicia are enabled and disabled. For example, a female character speaking may speak at a different audio frequency from a male character, and the difference in audio frequency may prompt a user to enable audio-based display indicia. Certain audio frequencies may be difficult for some users to hear, and thus the user may enable audio-based display indicia when a certain audio frequency or certain range of audio frequencies is used in speech in the media content. As such, the system may learn a user's preferences by tracking and recording the user's actions and correlating or associating the actions with particular audio characteristics of the media content being played back and determining criteria for when the audio-based display indicia are enabled/disabled. That is, the system may generate an audio characteristic criteria based on learning of a user's actions in response to audio characteristics within the media content.

Further, the system may use a microphone to measure and track ambient noise in proximity to the display used for media playback. In such configuration, the system may track the ambient noise conditions and record when a user enables audio-based display indicia. Thus, an ambient noise characteristic may be employed by one or more embodiments, and specific criteria may be defined for the ambient noise audio characteristic.

Any or all of the above described features may be combined or used separately to generate a user preference audio profile that may be used to determine when audio-based display indicia should be enabled during media playback. That is, a user preference audio profile may be learned by a system and/or input by the user. The user preference audio profile may include one or more criteria that define instances when audio-based display indicia should be enabled automatically due to audio characteristics that may be monitored. For example, audio characteristics and associated criteria in a user preference audio profile may include, but are not limited to: (i) overall media content audio levels; (ii) media content dialogue versus music/sound effects levels; (iii) ambient noise levels; (iv) media content audio frequencies; (v) user manual input preferences; and/or (vi) changes in overall media content audio levels between one scene to another.

Figure 3:
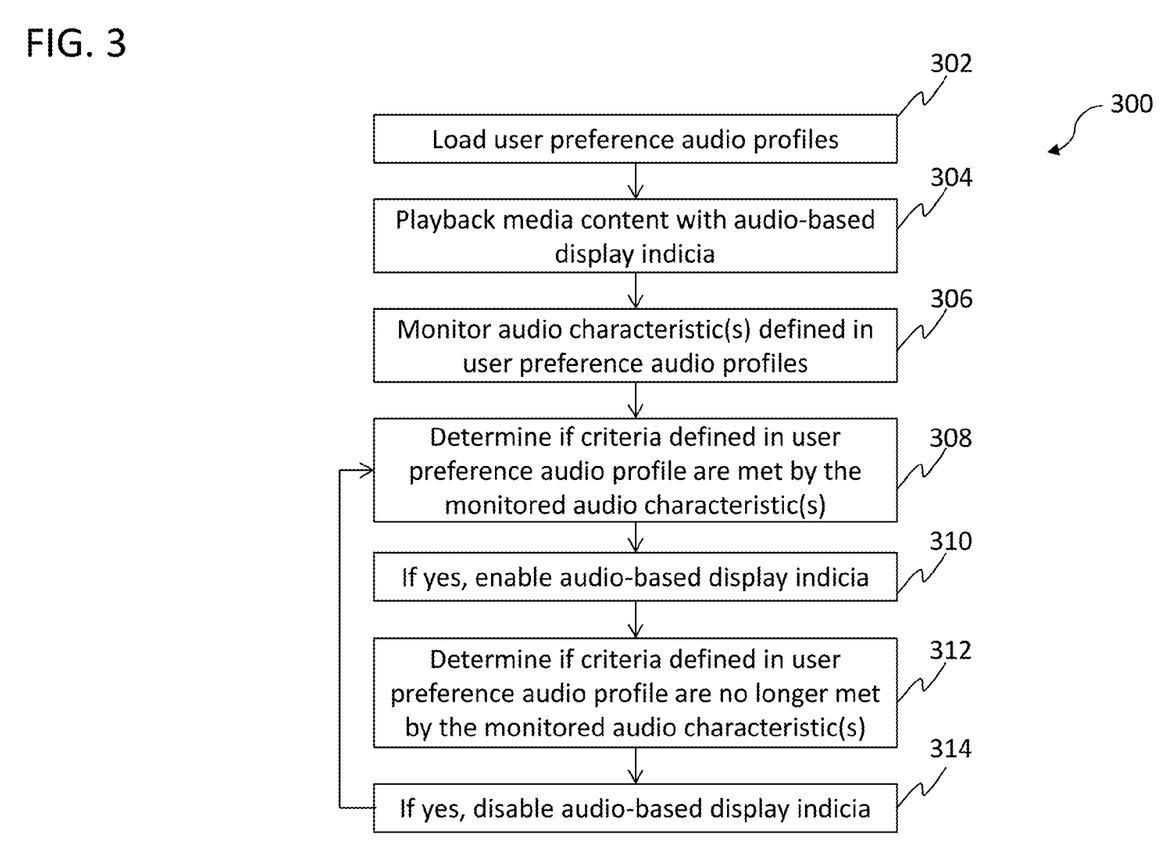
FIG. 3 is an illustrative flow process in accordance with an embodiment of the present disclosure for automatically presenting audio-based display indicia during media playback.

Turning to FIG. 3, an example of a flow process 300 in accordance with a non-limiting embodiment of the present disclosure is shown. The flow process 300 may be performed by one or more components of a system, such as system 210 of FIG. 2, which works on or within a media playback device such as a television or computer. The flow process 300 may be continuously run or performed when a user is watching playback of media content. For example, the flow process 300 may be performed on and with media that has abrupt changes in the soundtrack that make it difficult for a user to understand the spoken portion or dialogue of the audio of the media playback.

A system that is configured to playback media content may load one or more user preference audio profiles, as shown at block 302. The loading of the user preference audio profiles may be from a memory in the system, such as a memory that is used to store one or more user preference audio profiles that are learned or generated by the system, as described above. Alternatively, the loading of the user preference audio profiles may be from some other memory that is external to the system. For example, the user preference audio profiles may be loaded from an external storage device such as a USB drive, external hard drive, etc. or may be loaded from a source through the internet or through another network.

During loading of the user preference audio profiles, the system may store one or more audio characteristics and associated criteria that are part of the user preference audio profiles. That is, the system may input into a monitoring system various audio characteristics that are to be monitored and also input associated criteria related to enabling audio-based display indicia, such as described above. Thus, the system may load multiple audio characteristics to be monitored and the criteria associated with each audio characteristic. As one example, if an ambient noise characteristic and associated criterion is loaded as part of the user preference audio profile, the system may be configured to employ a microphone to monitor ambient noise to determine if the criterion is met. Similarly, in another example, if a user has preferences related to media content dialogue versus music/sound effects levels and/or related to media content audio frequencies, the system may be configured to monitor digital or analog information of the media content related to these audio characteristics.

In accordance with some embodiments of the present disclosure, more than one user preference audio profile may be loaded into the system. In one example of a multi-user situation, the user preference audio profiles may be combined such that when a criterion of any user whose user preference audio profile was loaded is met, the audio-based display indicia may be enabled. Thus, if multiple user preference audio profiles are loaded, if a situation arises when only one of the user's criteria is met, the audio-based display indicia may be enabled.

The system may playback media content that includes audio-based display indicia, as shown at block 304. The media content may have existing subtitles that are embedded with or part of the media content or closed captioning functionality may be part of the media content (e.g., in the case of a live broadcast). In the case of subtitles, the system may load the subtitles from the source of the media content, whether a physical source (e.g., a DVD) or from a digital source (e.g., a streaming service). In the case of closed captioning, the system may receive the closed captioning information as a stream of information that is received with the media content, such as with respect to a live broadcast of the media content.

At block 306 the system may monitor audio characteristics that are identified from the user preference audio profiles. For example, the system may be configured to monitor digital or analog information associated with the audio in the media content being played back. Further, in some embodiments, the system may be configured to monitor ambient noise in proximity to a display and/or speakers used to playback the media content. The system may monitor specific values or metrics associated with the audio characteristics obtained from the user preference audio profiles.

At block 308, the system is configured to determine if one or more monitored audio characteristics meets a criteria from the loaded user preference audio profiles.

If it is determined that one or more of the criteria from the user preference audio profiles are met, the system will automatically enable audio-based display indicia in the media content playback, as shown at block 310. For example, if a criterion is met, the system may enable subtitles or closed captioning, such that audio-based display indicia may be displayed for the viewer to read and understand the dialogue of the narrative in the media content.

At block 312, the system is configured to continue to monitor the criteria from the user preference audio profiles to determine if the audio characteristics no longer meet an associated user-defined criteria for the audio characteristics.

At block 314, if it is determined that the monitored audio characteristics(s) no longer meet the criteria in the user preference audio profiles, the system is configured to disable the audio-based display indicia. Once the audio-based display indicia is disabled, the process 300 may return to block 308 to monitor for and determine if one or more audio characteristics are detected as meeting one or more criteria from user preference audio profiles to again enable the audio-based display indicia.

An example scenario employing an example non-limiting embodiment in accordance with the present disclosure will now be provided. In this example, a group of friends (an owner and guests) intend to watch an action film on a television and the group of friends wants to avoid constantly changing the volume of the television. The film may have subtitles embedded into the playback data of the movie. As such, a system incorporating the systems and processes described herein may be activated to automatically enable and/or activate audio-based display indicia. The owner of the television may have a user preference audio profile stored in the system, which may be loaded by the system when the movie is being prepared for playback and viewing. Further, one of the guests may be unable to hear high frequencies and may also have a user preference audio profile. The owner may import the guest user preference audio profile so that the system combines the guest user preference audio profile with the owner's user preference audio profile.

Due to the combination of the user preference audio profiles, the system may be configured to reference a number of user defined criteria for various audio characteristics. For example, during playback of the movie, the system may be configured to monitor for and turn on the audio-based display indicia when the following conditions are met: (i) the overall volume drops below a certain pre-determined level; (ii) the volume of the dialogue track versus the other tracks of the film become too low; and (iii) a character with a high voice is speaking (which may be imported from the guest profile).

Any of the criteria and/or audio characteristics may be defined by either user preference audio profile. That is, both user preference audio profiles may have criteria for the same audio characteristic. In accordance with some embodiments of the present disclosure, when multiple user preference audio profiles are uploaded with differing criteria, the criteria that is the most sensitive may be given preference, such that the audio-based display indicia is enabled when any one viewer may require or desire the audio-based display indicia to be enabled. Advantageously, due to the process employed by systems described herein, the group in this example does not have to worry about turning on audio-based display indicia manually and missing or having to repeat portions of the film for one or more people watching.

Technical effects and benefits include an ability for a system to automatically enable and disable audio-based display indicia based on user preferences. For example, users may not need to keep the audio-based display indicia displayed constantly, but may only have the audio-based display indicia displayed when needed or desired as defined by the user. Further, advantageously, users may not need to constantly adjust the volume of media content during playback because the audio-based display indicia may be provided for the instances when a user may desire the audio-based display indicia to be displayed.

Further, technical effects and benefits include a system configured to dynamically learn and generate a user preference audio profile by monitoring, tracking, and learning when a user enables and/or disables audio-based display indicia. Such learning and dynamic generation of a user preference audio profile may be based on generating one or more criteria for one or more audio characteristics.

Further, advantageously, users who can only hear select frequencies do not need to try to find an alternative source (such as a male newscaster for someone who has trouble with higher frequency sounds and can't understand females well, etc. . . . ). That is, if a female is speaking, the audio-based display indicia may be automatically enabled such that a user can understand the content of the news, in this example, without having to find a different news source. Furthermore, in accordance with various embodiments, advantageously, users may not need to change position with respect to an audio source to hear better, but rather may be able to maintain their viewing position and have the audio-based display indicia automatically enabled. Moreover, users may not have to rewind or replay portions of media content with new audio/subtitle options to make up for what was missed.

Further, advantageously, embodiments here may be applied to various types of media content and playback thereof. For example, in addition to television and movies, embodiments herein may be applied to training videos and materials, online education, streaming conference presentations, video conferencing, etc.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed:

1. A computer implemented method to automatically enable audio-based display indicia during playback of a media content, the method comprising:
   receiving, by a processor, one or more user preference audio profiles, the user preference audio profiles defining at least one audio characteristic and an associated criteria;
   playing the media content having audio-based display indicia;
   monitoring, with one or more detectors, the at least one audio characteristic defined in the user preference audio profiles, wherein the at least one audio characteristic comprises a volume of dialogue in a narrative in the media content, the monitoring comprises monitoring the volume of dialogue in the media content, the at least one audio characteristic further comprises an audio frequency of the dialogue in the narrative in the media content, and the monitoring further comprises monitoring the audio frequency of the dialogue in the media content;
   automatically generating the one or more user preference audio profiles based on a user's actions without requiring active input from the user to configure the one or more user preference audio profiles, wherein the generating comprises tracking when the user enables the audio-based display indicia, and comparing the action of enabling the audio-based display indicia to the at least one audio characteristic to determine the associated criteria for enabling the audio-based display indicia, and the generating comprises automatically tracking when the user enables audio-based display indicia based on transitions from a loud scene to a quiet scene within the played media content;
   when the at least one audio characteristic meets the associated criteria, enabling the audio-based display indicia in the media content, wherein the at least one audio characteristic meets the associated criteria when a certain audio frequency or certain range of audio frequencies is used in the dialogue in the narrative; and
   when the monitored audio characteristic no longer meets the associated criteria, disabling the audio-based display indicia in the media content.

2. The computer implemented method of claim 1, wherein the audio-based display indicia is at least one of subtitles or captions related to the media content.

3. The computer implemented method of claim 1, wherein the one or more detectors is at least one of a microphone or a device configured to monitor audio levels of the media content.

4. The computer implemented method of claim 1, further comprising generating the one or more user preference audio profiles based on input provided by the user.

5. The computer implemented method of claim 1, wherein the criteria in the one or more user preference audio profiles comprises a threshold value, and the audio-based display indicia are enabled when the threshold is met or exceeded by the audio characteristic.

6. The computer implemented method of claim 1, wherein the criteria in the one or more user preference audio profiles comprises a threshold value, and the audio-based display indicia are enabled when the audio characteristic falls below the threshold.

7. A system to automatically enable audio-based display indicia during playback of a media content comprising:
   a memory having computer readable instructions; and
   a processor configured to execute the computer readable instructions, the computer readable instructions comprising:
      receiving, by the processor one or more user preference audio profiles, the user preference audio profiles defining at least one audio characteristic and an associated criteria;
      playing the media content having audio-based display indicia;
      monitoring, with one or more detectors, the at least one audio characteristic defined in the user preference audio profiles, wherein the at least one audio characteristic comprises a volume of dialogue in a narrative in the media content, the monitoring comprises monitoring the volume of dialogue in the media content, the at least one audio characteristic further comprises an audio frequency of the dialogue in the narrative in the media content, and the monitoring further comprises monitoring the audio frequency of the dialogue in the media content;
      automatically generating the one or more user preference audio profiles based on a user's actions without requiring active input from the user to configure the one or more user preference audio profiles, wherein the generating comprises tracking when the user enables the audio-based display indicia, and comparing the action of enabling the audio-based display indicia to the at least one audio characteristic to determine the associated criteria for enabling the audio-based display indicia, and the generating comprises automatically tracking when the user enables audio-based display indicia based on transitions from a loud scene to a quiet scene within the played media content;
      when the at least one audio characteristic meets the associated criteria, enabling the audio-based display indicia in the media content, wherein the at least one audio characteristic meets the associated criteria when a certain audio frequency or certain range of audio frequencies is used in the dialogue in the narrative; and
      when the monitored audio characteristic no longer meets the associated criteria, disabling the audio-based display indicia in the media content.

8. The system of claim 7, wherein the audio-based display indicia is at least one of subtitles or captions related to the media content.

9. The system of claim 7, wherein the one or more detectors is at least one of a microphone or a device configured to monitor audio levels of the media content.

10. The system of claim 7, further comprising generating the one or more user preference audio profiles based on input provided by the user.

11. A computer program product to automatically enable audio-based display indicia during playback of a media content, the computer program product comprising a computer readable storage medium having program instructions embodied therewith, the program instructions executable by a processor to cause the processor to:
- receive, by the processor, one or more user preference audio profiles, the user preference audio profiles defining at least one audio characteristic and an associated criteria;
- play the media content having audio-based display indicia;
- monitor, with one or more detectors, the at least one audio characteristic defined in the user preference audio profiles, wherein the at least one audio characteristic comprises a volume of dialogue in a narrative in the media content, the monitoring comprises monitoring the volume of dialogue in the media content, the at least one audio characteristic further comprises an audio frequency of the dialogue in the narrative in the media content, and the monitoring further comprises monitoring the audio frequency of the dialogue in the media content;
- automatically generate the one or more user preference audio profiles based on a user's actions without requiring active input from the user to configure the one or more user preference audio profiles, wherein the generating comprises tracking when the user enables the audio-based display indicia, and comparing the action of enabling the audio-based display indicia to the at least one audio characteristic to determine the associated criteria for enabling the audio-based display indicia, and the generating comprises automatically tracking when the user enables audio-based display indicia based on transitions from a loud scene to a quiet scene within the played media content;
- when the monitored audio characteristic meets the associated criteria, enable the audio-based display indicia in the media content, wherein the at least one audio characteristic meets the associated criteria when a certain audio frequency or certain range of audio frequencies is used in the dialogue in the narrative; and
- when the monitored audio characteristic no longer meets the associated criteria, disabling the audio-based display indicia in the media content.

12. The computer program product of claim 11, wherein the audio-based display indicia is at least one of subtitles or captions related to the media content.

13. The computer program product of claim 11, wherein the one or more detectors is at least one of a microphone or a device configured to monitor audio levels of the media content.

14. The computer program product of claim 11, further comprising generating the one or more user preference audio profiles based on input provided by the user.

* * * * *